No. 694,607. Patented Mar. 4, 1902.
W. J. BREWER.
ANTIFRICTION JOURNAL BEARING.
(Application filed July 15, 1901.)
(No Model.) 2 Sheets—Sheet 1.
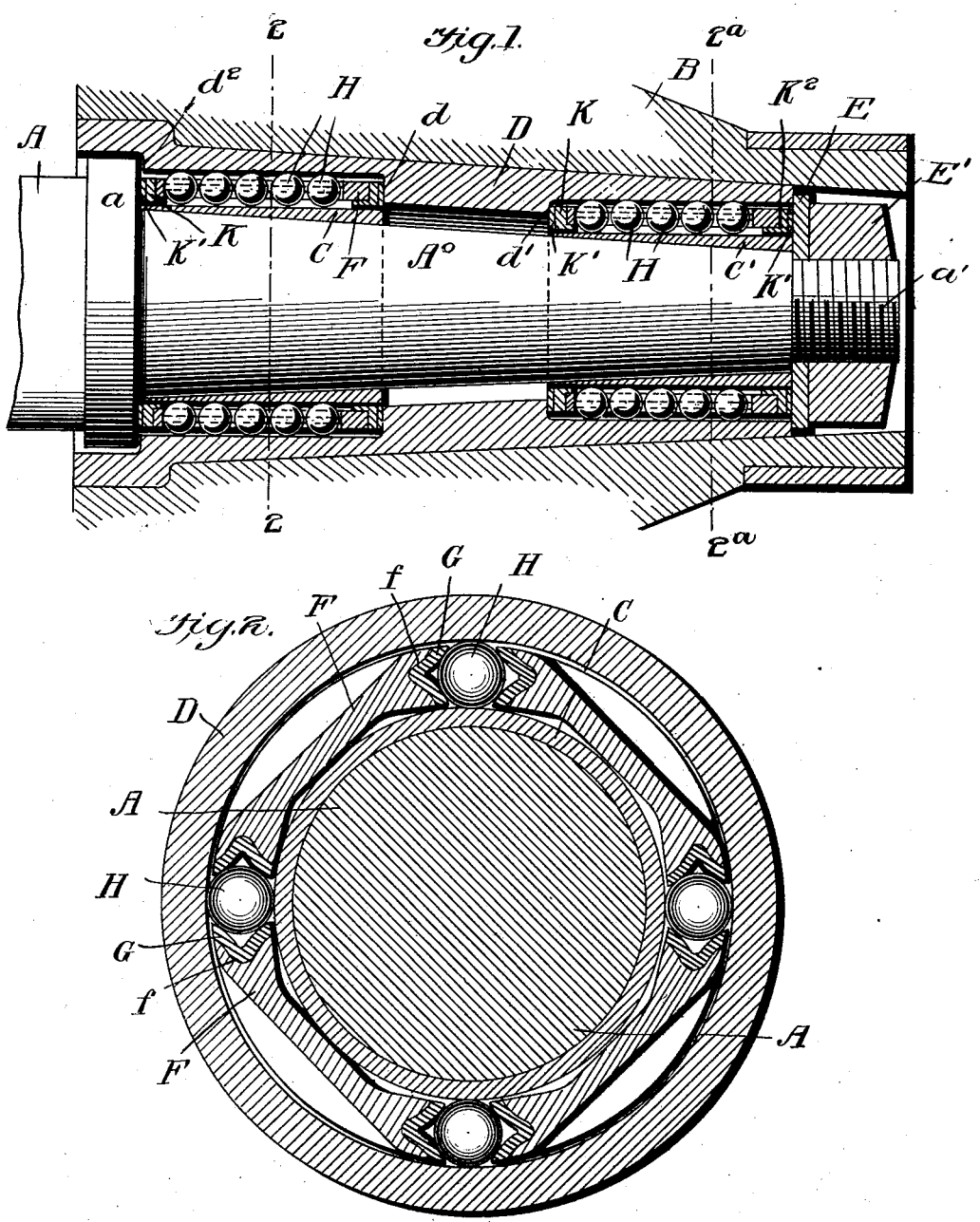

No. 694,607. Patented Mar. 4, 1902.
W. J. BREWER.
ANTIFRICTION JOURNAL BEARING.
(Application filed July 15, 1901.)
(No Model.) 2 Sheets—Sheet 2.

Witnesses Inventor
W. J. Brewer,
by Wilkinson & Fisher,
Attorneys.

UNITED STATES PATENT OFFICE.

WILLIAM JOHN BREWER, OF WASHINGTON, DISTRICT OF COLUMBIA, ASSIGNOR TO THE NATIONAL ROLLER AND BALL BEARING COMPANY, OF WASHINGTON, DISTRICT OF COLUMBIA, A CORPORATION OF VIRGINIA.

ANTIFRICTION JOURNAL-BEARING.

SPECIFICATION forming part of Letters Patent No. 694,607, dated March 4, 1902.

Application filed July 15, 1901. Serial No. 68,384. (No model.)

*To all whom it may concern:*

Be it known that I, WILLIAM JOHN BREWER, a subject of the King of Great Britain, but having applied for naturalization in the United States, residing at Washington, in the District of Columbia, have invented certain new and useful Improvements in Antifriction Journal-Bearings; and I do hereby declare the following to be a full, clear, and exact description of the invention, such as will enable others skilled in the art to which it appertains to make and use the same.

My invention relates to antifriction journal-bearings; and it consists in providing an improved ball or roller bearing in which the parts liable to wear are detachably mounted and may be readily and rapidly removed and replaced by others without necessitating the removal of the parts to the shop or factory for repairs.

The invention will be understood by reference to the accompanying drawings, in which—

Figure 3:
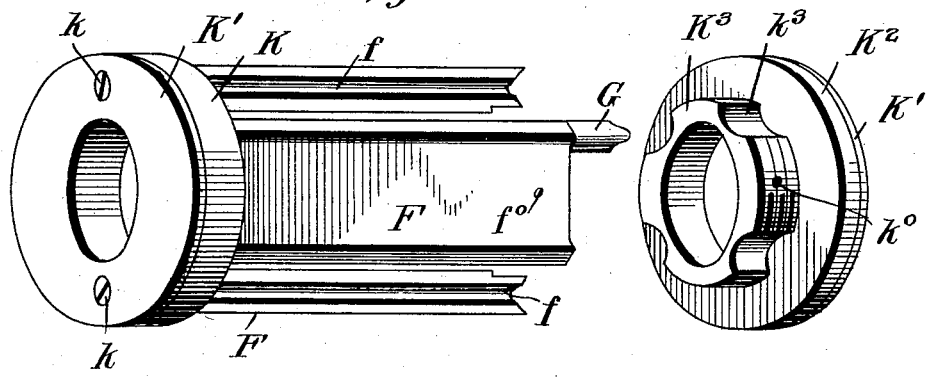

Figure 1 represents a section through the hub of a wheel, the axle being shown in elevation. Fig. 2 represents a section along the line 2 2 or $2^a$ $2^a$ of Fig. 1 enlarged, the body of the hub being omitted. Fig. 3 is a perspective view showing the cage in which the detachable wear-plates and balls are mounted, and Fig. 4 is a sectional view of a shaft-hanger fitted with the improved antifriction-rollers.

Referring now to Fig. 1, A represents an ordinary axle having a cone-shaped bearing-surface $A^0$, a flange $a$, and a screw-threaded end $a'$ to engage the nut $E'$. B represents a portion of the hub of a wheel. C C' represent set wear-sleeves of hardened steel mounted on the tapered portion $A^0$ of the axle, which sleeves are exteriorly cylindrical. D represents the journal-box, which is secured in the hub in any convenient way and is provided with shoulders $d$, $d'$, and $d^2$, abutting against the wear-rings K' and the flange $a$, respectively. E represents a washer held between the nut E' and the set wear-sleeve C'. Mounted over these set wear-sleeves C and C' is a ball-cage, which consists of annular heads K and $K^2$, each provided with a wear-plate K', detachably connected thereto, as by means of screws $k$. These heads are provided with hubs $K^3$, grooved, as at $k^3$, and are connected together by the tie-plates F. The tie-plates and heads may be secured together in any convenient way, as by means of a screw passing through the holes $f^0$ and $k^0$. (See Fig. 3.) These tie-plates F have longitudinal grooves or channels $f$ in the edges thereof, into which fit the detachable V-shaped wear-plates G. Between these V-shaped wear-plates G balls H are mounted. The parts C, D, G, and H should all be made of hardened material, preferably hard steel.

Figure 4:
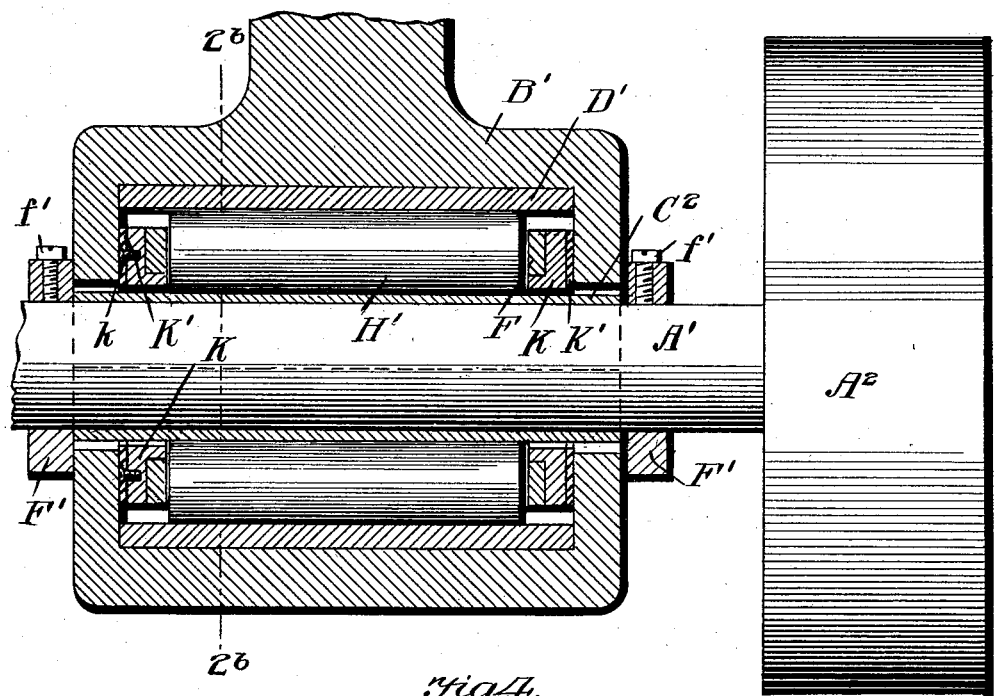

In the form of device shown in Fig. 4 the hub B of Fig. 1 is replaced by a shaft-hanger B' and the set wear-sleeve $C^2$ is made cylindrical. The shaft A' is provided with set collars F', held in place by screws $f'$ to prevent longitudinal motion of the shaft. $A^2$ represents a pulley or fly-wheel. H' are rollers.

It will be seen that all the parts subjected to heavy wear are made of hard metal and so mounted that they may be readily removed and others substituted without requiring the services of a skilled workman and that spare parts may be supplied, which may be put in as required without the expense and delay of sending the bearing to the shop or factory for repairs.

It will be evident that the device may be applied either to coned axles, as shown in Fig. 1, or cylindrical axles, as shown in Fig. 4. It will also be seen that that part of the bearing which includes the balls or rollers may be taken out as one piece and replaced after one or more of the wear-plates G have been removed and replaced or new balls substituted. It will be obvious that rollers may be substituted for balls, if desired.

Other advantages of the herein-described construction will readily suggest themselves to any practical mind.

It will be obvious that various changes might be made in the herein-described construction which could be used without departing from the spirit of my invention.

Having thus described my invention, what I claim, and desire to secure by Letters Patent of the United States, is—

1. In a roller-bearing, the combination with the detachable annular heads, and the tie-plates connecting the same, of wear-plates mounted in said tie-plates, and rollers mounted between said wear-plates, substantially as described.

2. In a roller-bearing, the combination with the detachable heads, of the channeled tie-plates connecting said heads, detachable V-shaped wear-plates mounted in said channeled tie-plates, and rollers mounted between said wear-plates, substantially as described.

3. In a roller-bearing, the combination with the detachable annular heads adapted to slide over the shaft or axle, and wear-rings detachably connected thereto, of the tie-plates connecting said heads and provided with channels, the detachable wear-plates mounted in said channels, and rollers mounted between said wear-plates, substantially as described.

4. In a roller-bearing, the combination with a wear-sleeve inclosing the shaft or axle, of a cage mounted exterior to said wear-sleeve and comprising detachable heads and tie-plates connecting the same, and wear-plates mounted in said tie-plates, with rollers mounted in said wear-plates, substantially as described.

5. In a roller-bearing, the combination with a wear-sleeve inclosing the shaft or axle, of a cage mounted exterior to said wear-sleeve and comprising detachable V-shaped wear-plates mounted in said channeled tie-plates with rollers mounted between said wear-plates, substantially as described.

6. In a roller-bearing, the combination with a wear-sleeve, of detachable annular heads adapted to slide over the shaft or axle, wear-rings detachably connected thereto, tie-plates connecting said heads and provided with channels therein, detachable wear-plates mounted in said channels, and rollers mounted between said wear-plates, substantially as described.

7. In a roller-bearing, the combination with the detachable annular heads with wear-rings detachably secured thereto and tie-plates connecting said heads, of wear-plates mounted in said tie-plates, and rollers mounted in said wear-plates, substantially as described.

8. In a roller-bearing, the combination with the detachable annular heads, and wear-rings detachably secured thereto, of the channeled tie-plates connecting said heads, detachable V-shaped wear-plates mounted in said channeled tie-plates, and rollers mounted between said wear-plates, substantially as described.

9. In a roller-bearing, the combination with detachable annular heads adapted to slide over the shaft or axle, with wear-rings detachably secured to said heads, of the tie-plates connecting said heads and provided with V-shaped channels therein, the detachable V-shaped wear-plates mounted in said channels, and rollers mounted between said wear-plates, substantially as described.

In testimony whereof I affix my signature in presence of two witnesses.

WILLIAM JOHN BREWER.

Witnesses:
FRANK D. BLACKISTONE,
J. STEPHEN GIUSTA.